US008560468B1

(12) United States Patent
Lerman et al.

(10) Patent No.: US 8,560,468 B1
(45) Date of Patent: Oct. 15, 2013

(54) LEARNING EXPECTED VALUES FOR FACTS

(75) Inventors: Kevin Lerman, New York, NY (US); Vinicius J. Fortuna, New York, NY (US); Andrew W. Hogue, Ho-Ho-Kus, NJ (US); John R. Provine, New York, NY (US); Engin Cinar Sahin, New York, NY (US); John J. Lee, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 13/025,117

(22) Filed: Feb. 10, 2011

(51) Int. Cl.
*G06F 15/18* (2006.01)
(52) U.S. Cl.
USPC .................................................. 706/12
(58) Field of Classification Search
None
See application file for complete search history.

(56) References Cited

U.S. PATENT DOCUMENTS

| | | | | |
|---|---|---|---|---|
| 5,010,478 | A * | 4/1991 | Deran | 1/1 |
| 6,609,123 | B1 * | 8/2003 | Cazemier et al. | 1/1 |
| 7,587,387 | B2 | 9/2009 | Hogue | |
| 7,774,328 | B2 | 8/2010 | Hogue et al. | |
| 7,966,291 | B1 * | 6/2011 | Petrovic et al. | 707/641 |
| 7,970,766 | B1 * | 6/2011 | Shamsi et al. | 707/737 |
| 8,005,842 | B1 * | 8/2011 | Pasca et al. | 707/741 |
| 8,122,026 | B1 | 2/2012 | Laroco, Jr. et al. | |
| 8,260,785 | B2 | 9/2012 | Hogue et al. | |
| 2007/0185895 | A1 * | 8/2007 | Hogue et al. | 707/102 |
| 2007/0198481 | A1 * | 8/2007 | Hogue et al. | 707/3 |
| 2007/0198597 | A1 * | 8/2007 | Betz et al. | 707/201 |
| 2007/0282872 | A1 * | 12/2007 | Probst et al. | 707/100 |
| 2007/0282892 | A1 * | 12/2007 | Probst et al. | 707/102 |
| 2008/0077570 | A1 * | 3/2008 | Tang et al. | 707/5 |
| 2009/0282010 | A1 * | 11/2009 | Vasudevan et al. | 707/4 |
| 2009/0292687 | A1 * | 11/2009 | Fan et al. | 707/5 |
| 2009/0313247 | A1 * | 12/2009 | Hogue | 707/5 |
| 2010/0153187 | A1 * | 6/2010 | Ghani et al. | 705/10 |

OTHER PUBLICATIONS

Wong Y. et al., "Scalable Attribute-Value Extraction from Semi-Structured Text", 2009 IEEE International Conference on Data Mining Workshops, pp. 302-307.*
Probst K. et al., "Semi-Supervised Learning of Attribute-Value Pairs from Product Descriptions", IJCAI-07, 2007, pp. 2838-2843.*
Probst K. et al., "Extracting and Using Attribute-Value Pairs from Product Descriptions on the Web", From Web to Social Web: Discovering and Deploying User and Content Profiles, Springer Berlin Heidelberg, 2007, pp. 41-60.*
Bellare K. et al., "Lightly-Supervised Attribute Extraction", NIPS 2007, vol. 3, No. 1, 2007.*
Jennifer Chu-Carroll "A Multi-Strategy and Multi-Source Approach to Question Answering", IBM T.J. Watson Research Center, Yorktown Heights, NY, 2006.*

* cited by examiner

*Primary Examiner* — Jeffrey A Gaffin
*Assistant Examiner* — Dave Misir
(74) *Attorney, Agent, or Firm* — Fish & Richardson P.C.

(57) ABSTRACT

Methods, systems, and apparatus, including computer programs encoded on a computer storage medium, for machine learning. In one aspect, a method includes receiving a collection of facts, each fact represented as an entity-attribute-value tuple; identifying expected values for one or more individual attributes, where the identifying expected values includes, for each particular attribute: identifying facts having the attribute, calculating a value score for facts of the collection of facts having the particular attribute for each particular value, calculating a global score for all facts of the collection having the attribute, and comparing the value score to the global score such that a value is identified as an expected value if the comparison satisfies a specified threshold.

24 Claims, 4 Drawing Sheets

LEARNING EXPECTED VALUES FOR FACTS

BACKGROUND

This specification relates to machine learning.

Internet search engines aim to identify resources (e.g., web pages, images, text documents, multimedia context) that are relevant to a user's needs and to present information about the resources in a manner that is most useful to the user. Internet search engines return a set of search results in response to a user submitted query.

Users can search for the answers to fact queries. Conventional search engines can include a database of facts built by extracting data from resources. Typically, the database provides facts indexed by query. If the query matches an entry in the database, the corresponding fact can be presented to the user. Conventional data extraction techniques can be used to collect the database of facts. However, the conventional extraction techniques typically result in erroneous facts being included in the database of facts.

SUMMARY

This specification describes technologies relating to machine learning.

In general, one aspect of the subject matter described in this specification can be embodied in methods that include the actions of receiving a collection of facts, each fact represented as an entity-attribute-value tuple; identifying expected values for one or more individual attributes, where the identifying expected values includes, for each particular attribute: identifying facts having the attribute, calculating a value score for facts of the collection of facts having the particular attribute for each particular value, calculating a global score for all facts of the collection having the attribute, and comparing the value score to the global score such that a value is identified as an expected value if the comparison satisfies a specified threshold. Other embodiments of this aspect include corresponding systems, apparatus, and computer program products.

These and other embodiments can optionally include one or more of the following features. Calculating the value score includes: identifying a source and confidence for each fact having the particular value; and calculating a score as a function of a sum of confidences for each source and a sum of all confidences. Calculating the global score includes: identifying a source and confidence for each fact having the particular attribute; and calculating a score as a function of a sum of confidences for each source and a sum of all confidences. The method further includes receiving one or more string-category associations, where each string is associated with zero or more categories; identifying a category for facts in the collection of facts using the strings of the facts; calculating a category score for facts of the collection of facts having the particular attribute and belonging to the category; and comparing the category score to the global score such that the category is identified as an expected category for the attribute if the comparison satisfies a specified threshold.

The comparing includes determining a fraction of the respective category score relative to the global score. The method further includes determining whether an expected value is a list. The determining includes: dividing values for facts in the collection of facts having the attribute into two or more components; for each fact, determining whether each component of a fact belongs to the same category where facts having components belonging to the same category are list facts; scoring a group of list facts; and comparing the score for the group of list facts relative to a global score for list facts across attributes. The method further includes identifying expected values for attributes associated with particular entity categories.

Particular embodiments of the subject matter described in this specification can be implemented so as to realize one or more of the following advantages. Expected values and expected categories can be identified for attributes and entities using a collection of facts. Expected values and categories can be used to extract facts while reducing errors. A hierarchical arrangement of categories can be generated where categories can have one or more subcategories in order to generated finer-grained results. The expected values for a particular category identified from a set of facts can be used to identify ranges of expected values. Values outside the expected range can be ignored when extracting facts. A distribution of facts over multiple hosts is used when scoring to learn categories or values that occur frequently and across many different hosts.

Additionally, the techniques can be used to learn what entities tend to have a certain attribute. As a result, an entity-specific expected-category map can be used to take entity categories with high scores and learn what entity categories have a particular attribute. Alternatively, the system can substitute entities for values. The result provides a map from attribute to expected entity categories and/or expected entities. Consequently different and finer grained expected values can be learned.

An existing fact table that includes inaccurate data can be leveraged to significantly improve its accuracy by pruning invalid facts (e.g., purported facts that do not conform to the expected values or categories for that fact). The system can also identify trends and learn differences among classes of entities (for example, NFL players are heavier than actors, and dates of birth tend to occur before dates of death).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

For a collection of facts of the form [entity] [attribute] [value] and a collection of string-category associations, a system can learn expected values given an attribute as well as expected value categories. Entities are the particular subjects of the fact, for example, a proper noun, e.g., a name of a particular person, item, or place (e.g., Barack Obama, Columbia River, Eiffel Tower, specific movie title). An attribute is a feature of the entity. For example, attributes can include height, length, rating. The value is the value for the attribute and can be, for example, a number or a string of letters.

String-category associations are mappings of one or more strings to particular categories. For example, given a number of facts that describe the heights of different people, the system can learn that the height of a person has the expected value category of "measurement" in a range of values from 4-7 feet. Similarly, expected categories and values for various text strings can be similarly learned. For example, the system can learn that a person's astrological sign [attribute] should be one of exactly 12 strings (e.g., belonging to the category "astrological sign") or that a movie's rating [attribute] should be one of a specified set of strings (e.g., "G", "PG", "PG-13", "R"). Thus, both value categories and particular value strings can be learned. This information can then be used by a system extracting facts and for providing factual answers in response to queries. In particular, erroneous answers that are not in the form of the expected values for the categories can be omitted or ignored when extracting facts (e.g., 100 miles is a measurement, but it would not satisfy the expected values range for a person's height).

Figure 1:
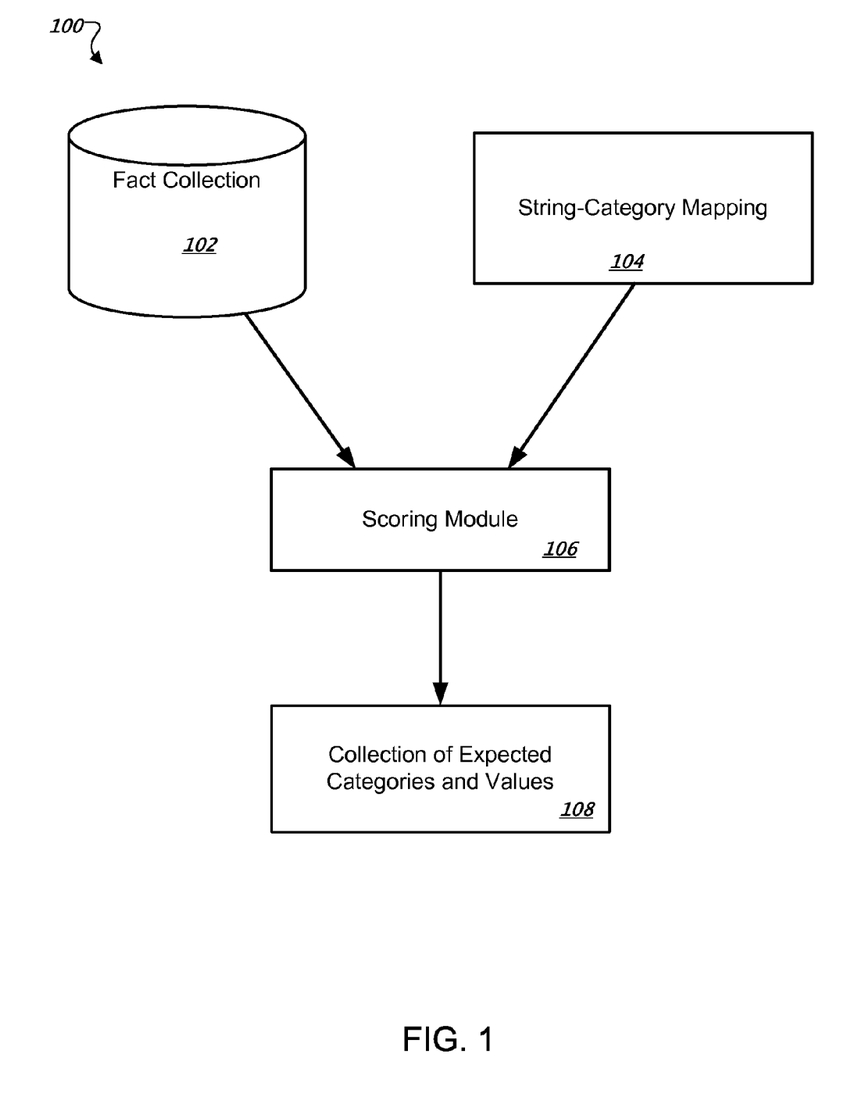
FIG. 1 is a diagram of an example system for identifying expected categories and values for facts.

FIG. 1 is a diagram of an example system 100 for identifying expected categories and values for facts. The example system 100 includes, as inputs, facts from a fact collection 102 and a string-category mapping 104. The facts can be a collection of facts extracted (e.g., from the web) using a conventional fact extraction process. Each fact can be represented by an [entity] [attribute] [value] tuple. For example, the fact "Barack Obama is 6 feet 1 inch tall" can be represented by the tuple [Barack Obama] [height] [6 feet 1 inch] where [Barack Obama] is a particular entity, [height] is a particular attribute, and [6 feet 1 inch] is a particular value for the attribute.

The fact collection 102 can be a database of fact tuples collected using the fact extraction process. Various automatic extraction techniques can be used, however, these typically result in noisy data identifying some "facts" that are incorrect (e.g., that Barack Obama is 20,000 feet tall).

Each fact in the fact collection 102 has one or more sources. In some implementations, each source represents an instance of the corresponding fact on a particular resource (e.g., a web page or other document). Additionally, each source has an associated confidence. The confidence of a fact is a function of the number of sources it has and their confidence. In particular, the confidence can be a value between zero and one [0, 1] that represents a confidence in the quality of the source. Thus, if there are have two sources A and B with confidence 0.8 and 0.2, respectively, the sum of the confidences adds up to 1.0. In some implementations, a particular function is applied to ensure that the sum of the confidences across sources is between 0 and 1. Alternatively, dividing the fact's confidence evenly among its sources can be used to quickly attempt to reverse-engineer the answer confidence into source confidences, even though they may not be true to the actual original confidence values.

In some other implementations, the confidences have been assigned according to a particular technique used to extract the associated facts. For example, some sources can be considered more authoritative than others and, consequently, assigned a higher confidence (e.g., a news page can be higher-confidence than an individual's blog). In another example, the exact positioning of the fact within the source can be used as a factor in assigning the confidence (e.g., a fact extracted from large, bold text on a page may be more authoritative than one buried deep inside small print). Thus, a fact having two sources where a first source is more authoritative (e.g., a news page) than the second source (e.g., a blog entry) can have respective confidence values of 0.8 and 0.2. In some implementations, other information is used as a factor in assigning confidence, for example, using domains for the sources of a given fact that are identified as more trusted than others for particular kinds of facts.

The string-category mapping 104 can provide, for a given string, zero or more categories to which the string belongs. A particular string (e.g., an entity or value in a fact) can map to one or more categories. For example, the string "5 feet" might only map to "measurement", while "Barack Obama" might map categories including, for example, "president," "democrat," "politician," and "human."

In some implementations, the string-category mapping 104 is part of a separate system. An interface can be used to communicate entities and values from facts and to receive corresponding categories. Alternatively, the mapping can be provided to the system allowing the scoring module 106 to obtain categories for fact entities and values in parallel and on demand. In some implementations, the mapping is incomplete and noisy. In some implementations, the mapping can be generated though a manual process of human annotations. In some other implementations, an automated process can map categories to entities by using patterns within a collection. Patterns can include, for example, "X is a Y" or "Y such as X" (e.g., "feet" is a "measurement" or "dogs such as poodles").

The facts of the fact collection 102 and categories from string-category mapping 104 are provided to, or accessed by, a scoring module 106. The scoring module 106 uses the facts and string-category mapping to calculate scores for categories and values for facts having a specified attribute. The scoring process is described in greater detail below. The scores are then used to identify a collection of expected categories and values 108 for facts having particular attributes. The collection of expected categories and values for the categories can be used to extract facts, or to verify facts, that can then be used identify answers to factual queries, e.g., received by a search system.

Figure 2:
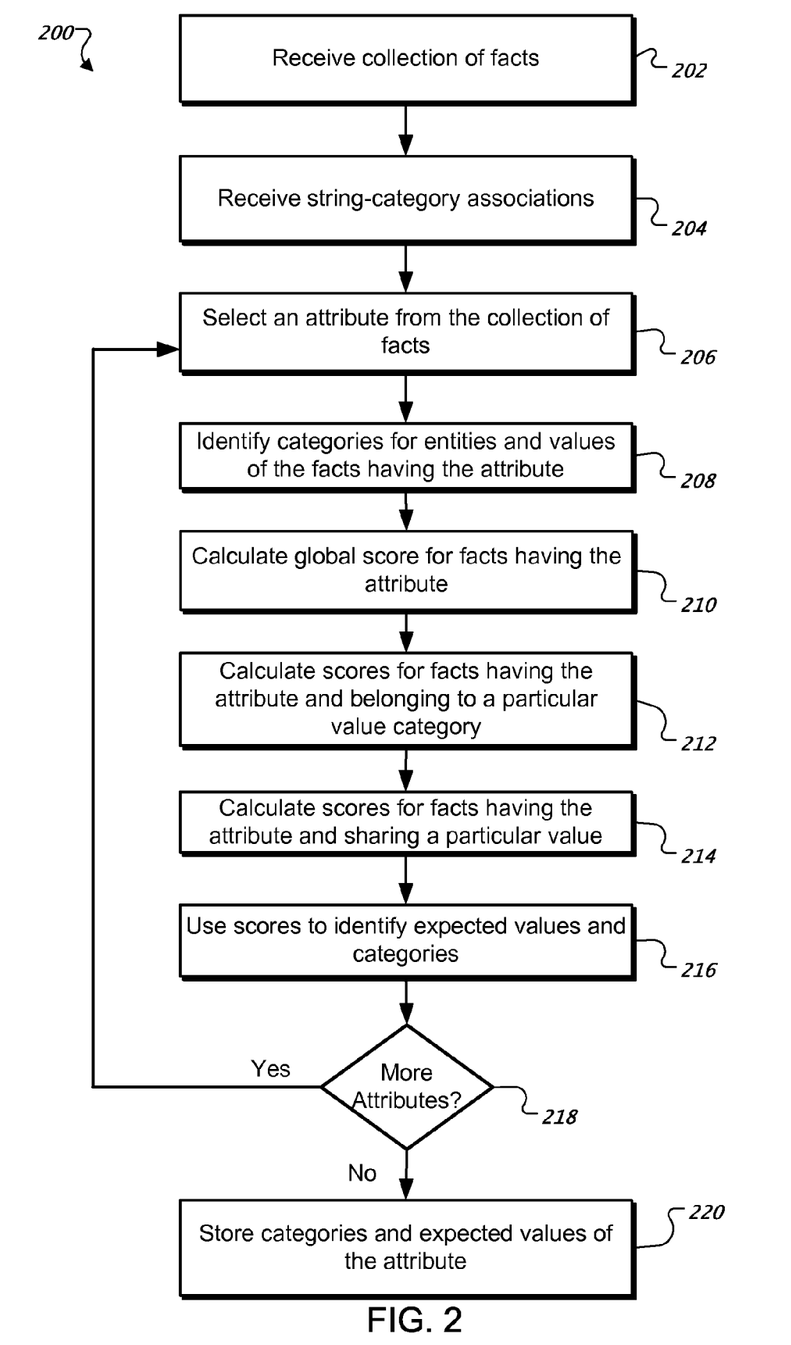
FIG. 2 is a flow diagram of an example method for identifying expected categories and values for facts.

FIG. 2 is a flow diagram of an example method 200 for identifying expected categories and values for fact. For convenience, the method 200 will be described with respect to a system, including one or more computing devices, that performs the method 200.

The system receives a collection of facts (202). The collection of facts can be fact tuples in the form of [entity] [attribute] [value]. The collection of facts can be obtained, for example, from the collection of facts 102 shown in FIG. 1.

The system also received string-category associations (204). The string-category associations can be a mapping or an interface to a mapping of strings and categories. Thus, for a given string, the system can identify which categories, if any, are associated with the string. In some implementations, the associations are received a string at a time as the corresponding strings from facts are being processed (e.g., for a particular grouping of facts from the collection). Alternatively, the system can identify all associations between strings in the collection of facts (e.g., entities and/or values) and categories using the mapping.

The system selects an attribute from the collection of facts (206). In particular, the received facts can be sorted by attribute such that for each attribute there is a corresponding set of facts having that attribute. For example, if the attribute is [height] a set of facts are identified that each have the attribute [height]. A number of different entities can be in these facts, for example, different names of individuals, heights of buildings, heights of objects. For example, the facts [Barack Obama] [height] [6 feet 1 inch], [Empire State Building] [height] [1,250 feet], and [computer brand x model y] [height] [0.8 inches] are all facts having the attribute [height].

For each fact having the selected attribute, the system identifies the categories (208) associated with the corresponding entity of the fact. For example, the facts can be annotated with the zero or more categories associated with the respective entity or value. In the examples above, a category for [Barack Obama] can be narrow category "presidents" or a broad category e.g., "name." Similarly, a category for [Empire State Building] can be "buildings."

Additionally, categories can be associated with particular values based on the kind of value of the fact. For example, the value [6 feet 1 inch] is associated with a "measurement" category while the value of [Aug. 4, 1961] is associated with a "date" category. In another example, a fact having a non-numerical value can also be associated with one or more categories. For example, the value [Taurus] can be associated with the categories of "zodiac" and "astrology."

The system calculates scores for groups of facts having the selected attribute. In particular, the system calculates a score for all facts having the selected attribute (e.g., all facts having attribute X) (210). The system calculates a score for all facts having the selected attribute and sharing a particular value category (e.g., all facts having attribute X and value category Y) (212). Additionally, the system calculates a score for all facts having the selected attribute and sharing a particular value (e.g., all facts having attribute X and value Z) (214). Calculating a score for a particular group of facts is described in detail with respect to FIG. 3.

Figure 3:
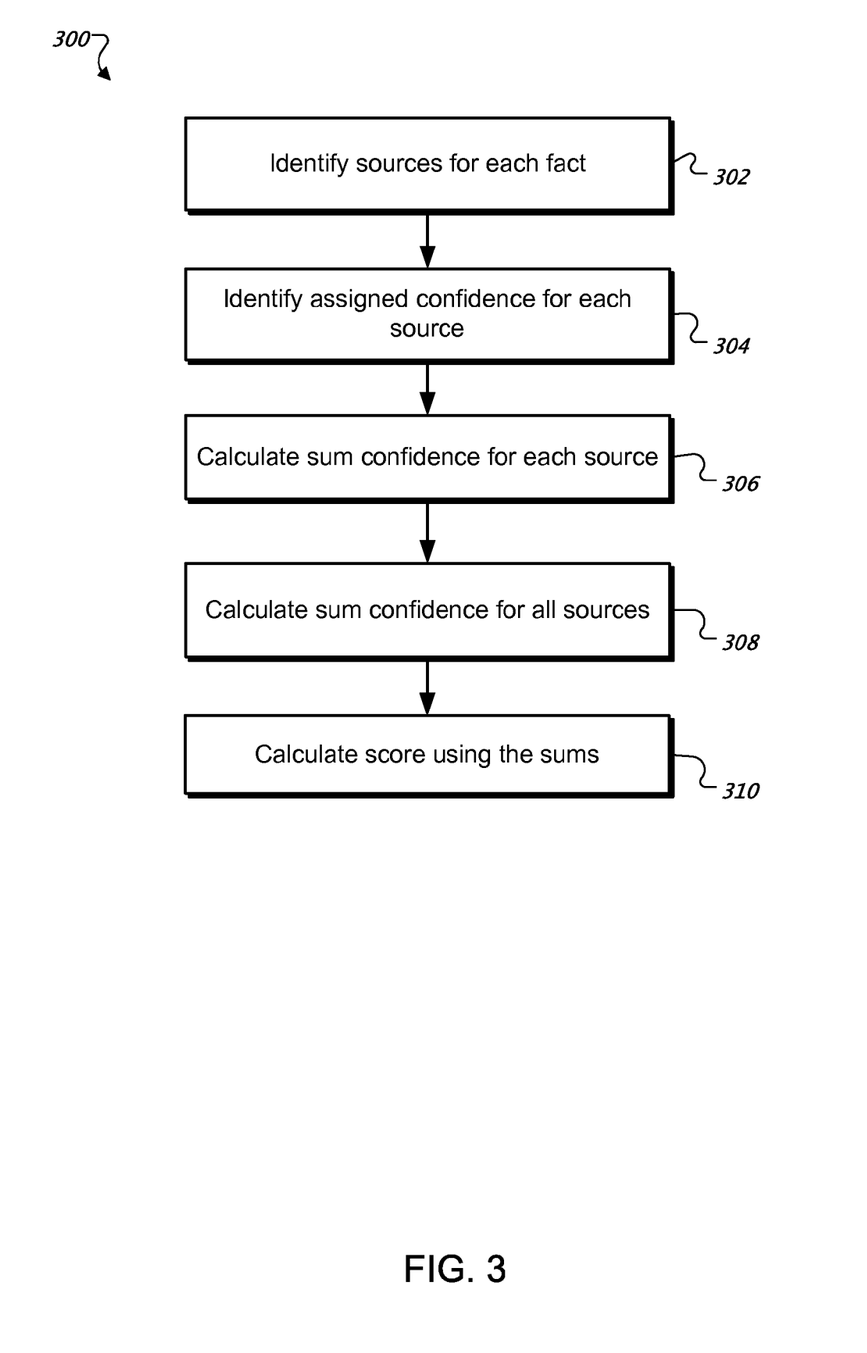
FIG. 3 is a flow diagram of an example method for scoring facts.

FIG. 3 is a flow diagram of an example method 300 for scoring facts. For convenience, the method 300 will be described with respect to a system, including one or more computing devices, that performs the method 300.

For a group of facts, the system identifies one or more sources for each fact (302). The source can identify a document or location from which the fact was extracted during a fact extraction process. For facts extracted from a collection of web resources, the source for each fact can be a particular uniform resource locator (URL) address. Each fact can have one or more sources. For example, a "fact 1" can have as sources "www.example1.com/abc" and "www.example2.com/def," each of which identify resources that include "fact 1". In some implementations, sources are stored as metadata to the facts (e.g., in the collection of facts 102). In some other implementations, the sources are identified in a database or table data structure that identifies each fact and the corresponding one or more sources for the fact.

The system identifies a confidence value to each source (302). The confidence values can be previously assigned and associated with the respective facts (e.g., as additional table or database entries for each fact). Alternatively, in some implementations, the confidence values are assigned as part of the method 300 when the sources are identified. In some implementations, a confidence value is assigned to each source for a given fact as a fraction of a total confidence. The confidence value can be evenly divided between sources or independently assigned. For example, a fact having two sources can have equal confidence values of 0.5 assigned to each source. Alternatively, the confidence value for to a given source can depend on a measure of how much confidence the particular source has. This measure can be based, for example, on one or more metrics of reliability, expertise, and reputation. Thus, an encyclopedia source or a news source can have a higher confidence than an individual's web page or blog entry including the fact. In some implementations, the confidence values have a range from [0, 1] for each source of a fact and sum to a total confidence of 1 per fact. Alternatively, the individual assigned confidence values for sources of a fact are assigned independent of each other. A function can be applied to the individual confidences or the sum of the confidences in order to ensure that the confidences are within the range [0, 1].

The system calculates a sum of the confidence values for each source (306). In particular, the confidence values are summed per source across the group of facts. Thus, if a particular source is identified for five different facts, the sum for that source is the sum of the five corresponding confidence values. The sources and confidence scores per source can be used to create a map of sources and confidence values.

In some implementations, sources having the same domain are considered the same source even though the full URL addresses may be different. For example, a first fact can have a source "www.example1.com/abc" with confidence value 0.5 and a second fact can have a source "www.example1.com/tuv" with confidence value 0.3. Since both sources include the domain "example1" they can be treated as the same source. As a result, the sum of the confidences for the source "www.example.com" is 0.5+0.3=0.8.

The system calculates a sum of the confidence values for all sources (308). Thus, for all facts in the group of facts and their respective sources, a total confidence value is calculated. For example, a sum of all of the source sums can be calculated. Thus, if a first source has a sum of confidences of 0.8 and a second source has a sum of confidences of 0.6, the total confidence value would be 1.4.

The system calculates a score for the facts using the sums (310). In particular, the sums for each source can be treated as a probability distribution over the sources (e.g., host domains). An entropy of the probability distribution can be calculated. The entropy is a measure of the randomness in the probability distribution. The overall sum multiplied by the entropy can be calculated as the score for the facts.

The sum component is an indication of how often values occur for a particular type of grouping (e.g., value category, particular value string). For example, when scoring the likelihood of values belonging to a particular value category, the system calculates the score for all facts with that attribute and that value category. The sum indicates how often that value category occurs. Similarly, when scoring the likelihood of a value being a particular string, the system calculates the score for all facts with the attribute and the value string. The sum then indicates how often that value itself occurs.

The entropy component indicates whether or not that type of value is tied to a particular source. If the entropy is low, then this type may be an artifact of one large source. For example, if a major movie review website decided to give all of its "popularity" facts (e.g., movie ratings) as a number of popcorn kernels, the particular source could bias how the system learns what "popularity" facts as a whole are supposed to look like, e.g., if the source had enough high-quality facts. However, since only that one web site would be expressing these facts that way, the popcorn kernel facts would have very little entropy and therefore would provide little bias to the system.

As shown in FIG. 2, scores are calculated for different groups of facts. The global score is calculated for all facts having the attribute regardless of category and values (210). For example, all facts having the attribute [height] can be grouped together and used to calculate the global score. The score can be calculated as described above with respect to FIG. 3. Thus, the global score can include differing values and categories. For example, the entity-attribute pair of [barack obama] and [height] can have some extracted facts having different values, e.g., some facts may have values of 6 feet 1 inch but some others may have a value of "8 feet." Moreover, the global score includes facts having the attribute but erroneous values, for example, the value "blue" for [height].

The score is also calculated for groups of facts having the attribute and belonging to particular value categories (212). Thus, for example, the group of facts can be one or more facts having an attribute [height] and a value category of "measurement." The score for each group of facts can be calculated as described above with respect to FIG. 3.

Another score is calculated for groups of facts having the attribute and having specific values (214). Thus, for example, the group of facts can be one or more facts having an attribute [height] and a specific value of "6 feet 1 inches." The score for each group of facts can again be calculated as described above with respect to FIG. 3. In some implementations, expected values are calculated without calculating scores to identify expected categories. For example, value scores for particular strings are calculated (e.g., for attribute "zodiac sign" and value "aries") without having any value category scores. In this scenario, the system can learn that a particular amount of all "zodiac sign" facts have the value "aries." The different sign values might belong to a category called "star signs" or even "zodiac signs." As a result, the system can learn that close to all "zodiac sign" facts are "star signs." The system can also learn that "aries," "taurus," and ten other strings are expected values for the attribute "zodiac sign".

The system uses the calculated scores to identify expected values and categories (216). Specifically, a comparison is made between a score for a value or category and the global score. For example, if a score for a particular value category exceeds a threshold relative to the global score (e.g., exceeds a specified fraction of the global score), the value category is considered an expected category for the attribute. Similarly, if the score for a particular value exceeds a threshold relative to the global score, the value is considered an expected value for the attribute. The threshold for an individual value's score can be different from the threshold for a category score.

The system determines whether there are additional attributes for the collection of facts (218). If there are additional attributes, the process repeats with the selection of a next attribute from the collection of facts (206). If there are no additional attributes, the expected categories and values for facts are stored (220).

The stored expected categories and values learned from an initial set of facts can be used to identify erroneous facts when extracting a collection of facts for use in providing answers in response to queries for facts. For example, if the expected category for the [height] attribute is a measurement, then an erroneous fact indicating Barack Obama's height as "blue" can be identified during a fact extraction process and excluded from a generated collection of facts.

Similarly, the expected values for the attribute can be used to identify facts that fall within the expected values or value ranges. For example, if the attribute is a person's height, the expected values may be between 4 and 7 feet. Thus, an indication of a height of 20,000 feet for a person would be identified as not conforming to the expected value range. Additionally, if the expected values are of a small set of specific values, they can be considered values for a closed class attribute where the values are always one of the set of specific values. For example, MPAA movie ratings, days of the week, and zodiac signs are always one of a small set of values.

Expected categories can be identified as having one or more subcategories. Use of the subcategories allows a more precise identification of value types for the particular subcategory. For example, a broad "people" category can includes as examples of subcategories "celebrities" or "actors." The category-subcategory relationships can be learned, for example, though manual processing of categories by human evaluators. Additionally, in some implementations, subcategories are identified in the string-category mapping.

Figure 4:
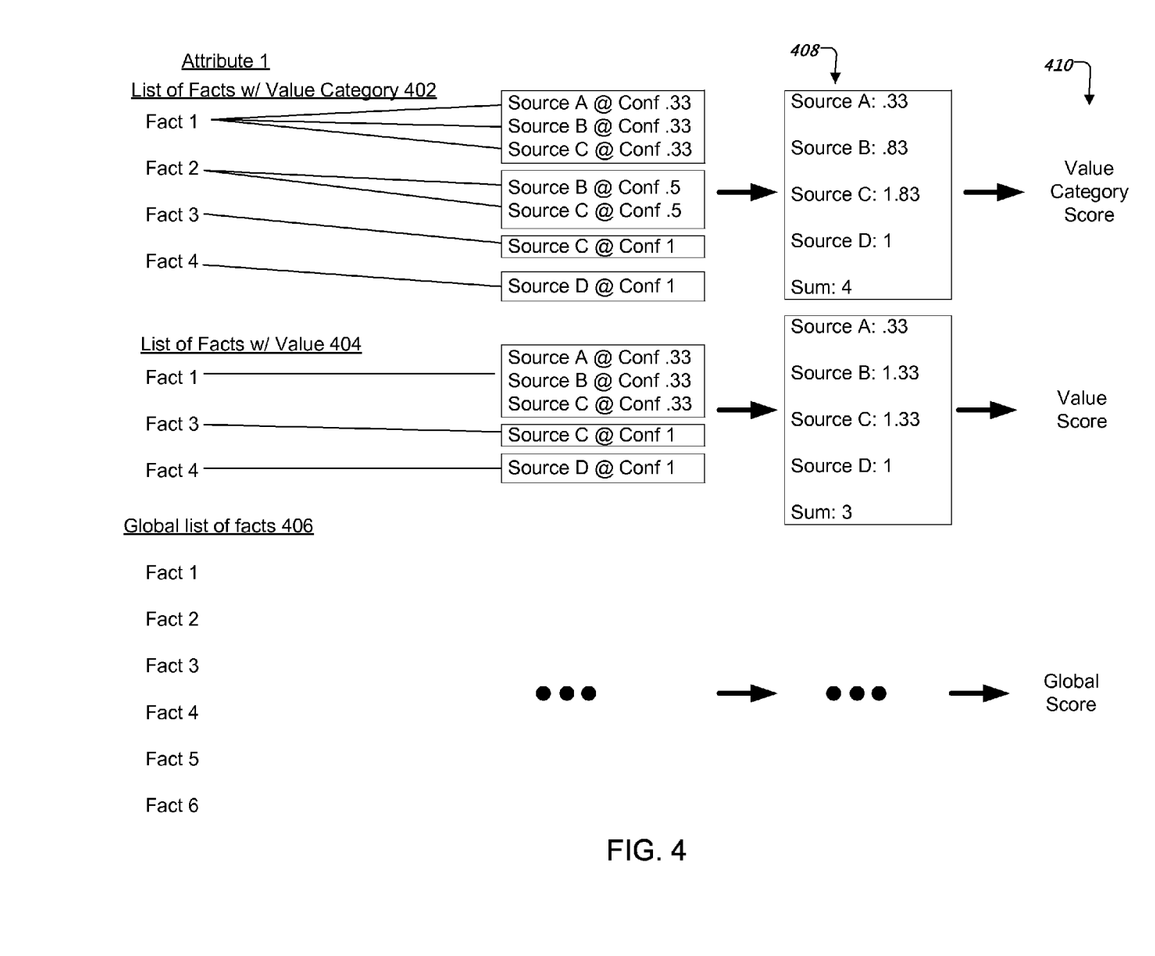
FIG. 4 is a diagram of an example identification of expected categories and values for facts.

FIG. 4 is a diagram of an example identification of expected categories and values for facts. FIG. 4 shows example steps for calculating scores for facts having a specific attribute. These scores can then be used to identify expected values and categories as described above. Specifically, the diagram shows three lists of facts: a list of facts with a specific value category 402, a list of facts with a specific value 404, and a global list of facts 406. The list of facts with a specific value category 402 includes facts 1, 2, 3, and 4. The list of facts with the specific value 404 includes facts 1, 3, and 4. The global list of facts 406 includes facts 1, 2, 3, 4, 5, and 6. Each fact has one or more sources for the fact. For example, fact 1 has three sources while fact 4 has only one source. Each source also has an associated confidence. In the example mapping shown, all facts have equally split confidences. However, other techniques of assigning confidence can be used including using other information to assign confidence values independently for each source, e.g., according to some measure of source quality. For each list of facts, the confidence values per source are combined 408. For example, source C includes facts 1, 2, and 3 resulting in a total source confidence value of 1.83. These confidences along with a sum across sources, are used to generate respective scores 410 for each list of facts.

In some implementations, expected numerical categories, e.g., measurements, dates, or prices, can further include a computation of weighted mean and standard deviation of the expected values. Each value can be weighted by a sum of the confidences of its sources. This information can be stored as part of the expected category. The mean and standard deviation of expected values can be used to define value ranges. For example, the system can learn that a height of people, based on identified values, should generally have an expected value of 5 feet 7 inches +/−18 inches. Additionally, the system can scale the confidence of new facts according to their distance from the mean.

While the above discussion referred to identifying expected values and categories for particular attributes, a similar process can be used to identify expected values and categories for attributes of particular entity categories (i.e., a category of entities rather than specific entities). In particular, expected values and categories for each particular entities associated with a given attribute in the collection of facts can be identified. Scores can be calculated for facts having a particular value category and for facts having particular values for each entity. These scores can then be compared with a global score for all facts of the corresponding entity to identify expected categories and values for the entity. Additionally, the system can use the expected entities and values to differentiate between different kinds of entities having a same value category. For example, the system can learn that the expected value type for "river" entities' length attribute is a distance. Thus, for any given fact having an entity that is a river name and a length attribute, the expected value type is a distance (e.g., in meters). Similarly, the system can learn that the expected value type for "movie" entities' length attribute is a time in minutes. Thus, different entity categories (e.g., rivers vs. a specific river, for example, the Columbia River) can be used to find expected values for attributes where the expected values for the same attribute can differ between entity categories.

In some implementations, the system can identify values for attributes (or entities) expected to be lists. The system can split the value of a fact (e.g., using a tokenization technique) and identify associated categories for each component of the value (e.g., as demarcated by commas). If the components of the value each share a category, the overall value for the fact is considered to be a list whose members are expected to belong to that common category. A group of these identified list facts is assembled and scored. If the score for the group is greater than a threshold relative to a global score for list facts across attributes, then the attribute is considered to have lists of items as expected values. Similarly, entities can be identified as having lists of items as expected values.

Similar scoring techniques can be used to identify other arbitrary aspects of facts. For example, the system can learn whether a number-valued attribute often has a value expressed as an integer or as a floating point number (e.g., area codes are integers while grade-point averages are floating point numbers). To learn the expected form of number values, a global group of facts is generated containing all the facts having a particular attribute (and possibly a particular entity) with values as numbers. Respective groups of facts are then generated for each option being considered, specifically, a group of facts where the value is an integer and a group of facts where the value is a floating-point number. The score ratio between the integer or floating-point facts and the global group of facts indicates the extent to which the values are expected to be expressed in one form or the other.

Other types of aspects can be identified using a similar process, for example, expected units of measurement (e.g., heights of people in the U.S. are usually expressed in feet), expected currency codes (e.g., NFL players' salaries are given in U.S. dollars, while European soccer players' salaries are given in Pounds or Euros), expected months (e.g., people's "graduation dates" [attribute] tend to occur in May), and whether or not a phone number is expected to be toll-free (e.g., companies' phone numbers are more likely to be toll-free than individuals' phone numbers).

In some implementations, instead of a string-category mapping, attributes or values strings can be mapped to regular expressions. In particular, the system can use the mapping to learn that a person's weight (e.g., based on publically available facts, for example of athletes) tends to be a series of digits followed by the string "lbs". Similarly, the system could also learn attributes that map to small sets of values (e.g., movie ratings, zodiac signs), because those values are also regular expressions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a collection of facts, each fact represented as an entity-attribute-value tuple;
   identifying expected values for one or more individual attributes, where the identifying expected values includes, for each particular attribute:
   identifying facts having the attribute,
   calculating a value score for facts of the collection of facts having the particular attribute for each particular value,
   calculating a global score for all facts of the collection having the attribute, and
   comparing the value score to the global score such that a value is identified as an expected value if the comparison satisfies a specified threshold.

2. The method of claim 1, where calculating the value score includes:
   identifying a source and confidence for each fact having the particular value; and
   calculating a score as a function of a sum of confidences for each source and a sum of all confidences.

3. The method of claim 1, where calculating the global score includes:
   identifying a source and confidence for each fact having the particular attribute; and
   calculating a score as a function of a sum of confidences for each source and a sum of all confidences.

4. The method of claim 1, further comprising:
   receiving one or more string-category associations, where each string is associated with zero or more categories;
   identifying a category for facts in the collection of facts using the strings of the facts;
   calculating a category score for facts of the collection of facts having the particular attribute and belonging to the category; and
   comparing the category score to the global score such that the category is identified as an expected category for the attribute if the comparison satisfies a specified threshold.

5. The method of claim 4, where the comparing includes determining a fraction of the respective category score relative to the global score.

6. The method of claim 1, further comprising determining whether an expected value is a list.

7. The method of claim 6, where the determining includes:
dividing values for facts in the collection of facts having the attribute into two or more components;
for each fact, determining whether each component of a fact belongs to the same category where facts having components belonging to the same category are list facts;
scoring a group of list facts; and
comparing the score for the group of list facts relative to a global; core for list facts across attributes.

8. The method of claim 1, further comprising identifying expected values for attributes associated with particular entity categories.

9. A system comprising:
one or more computing devices operable to perform operations including:
receiving a collection of facts, each fact represented as an entity-attribute-value tuple;
identifying expected values for one or more individual attributes, where the identifying expected values includes, for each particular attribute:
identifying facts having the attribute,
calculating a value score for facts of the collection of facts having the particular attribute for each particular value,
calculating a global score for all facts of the collection having the attribute, and
comparing the value score to the global score such that a value is identified as an expected value if the comparison satisfies a specified threshold.

10. The system of claim 9, where calculating the value score includes:
identifying a source and confidence for each fact having the particular value; and
calculating a score as a function of a sum of confidences for each source and a sum of all confidences.

11. The system of claim 9, where calculating the global score includes:
identifying a source and confidence for each fact having the particular attribute; and
calculating a score as a function of a sum of confidences for each source and a sum of all confidences.

12. The system of claim 9, further operable to perform operations comprising:
receiving one or more string-category associations, where each string is associated with zero or more categories;
identifying a category for facts in the collection of facts using the strings of the facts;
calculating a category score for facts of the collection of facts having the particular attribute and belonging to the category; and
comparing the category score to the global score such that the category is identified as an expected category for the attribute if the comparison satisfies a specified threshold.

13. The system of claim 12, where the comparing includes determining a fraction of the respective category score relative to the global score.

14. The system of claim 9, further operable to perform operations comprising determining whether an expected value is a list.

15. The system of claim 14, where the determining includes:
dividing values for facts in the collection of facts having the attribute into two or more components;
for each fact, determining whether each component of a fact belongs to the same category where facts having components belonging to the same category are list facts;
scoring a group of list facts; and
comparing the score for the group of list facts relative to a global score for list facts across attributes.

16. The method of claim 9, further operable to perform operations comprising identifying expected values for attributes associated with particular entity categories.

17. A non-transitory computer storage medium encoded with a computer program, the program comprising instructions that when executed by data processing apparatus cause the data processing apparatus to perform operations comprising:
receiving a collection of facts, each fact represented as an entity-attribute-value tuple;
identifying expected values for one or more individual attributes, where the identifying expected values includes, for each particular attribute:
identifying facts having the attribute,
calculating a value score for facts of the collection of facts having the particular attribute for each particular value,
calculating a global score for all facts of the collection having the attribute, and
comparing the value score to the global score such that a value is identified as an expected value if the comparison satisfies a specified threshold.

18. The computer storage medium of claim 17, where calculating the value score includes:
identifying a source and confidence for each fact having the particular value; and
calculating a score as a function of a sum of confidences for each source and a sum of all confidences.

19. The computer storage medium of claim 17, where calculating the global score includes:
identifying a source and confidence for each fact having the particular attribute; and
calculating a score as a function of a sum of confidences for each source and a sum of all confidences.

20. The computer storage medium of claim 17, further comprising instructions that when executed by data processing apparatus cause the data processing apparatus to perform operations comprising:
receiving one or more string-category associations, where each string is associated with zero or more categories;
identifying a category for facts in the collection of facts using the strings of the facts;
calculating a category score for facts of the collection of facts having the particular attribute and belonging to the category; and
comparing the category score to the global score such that the category is identified as an expected category for the attribute if the comparison satisfies a specified threshold.

21. The computer storage medium of claim 20, where the comparing includes determining a fraction of the respective category score relative to the global score.

22. The computer storage medium of claim 17, further comprising instructions that when executed by data processing apparatus cause the data processing apparatus to perform operations comprising determining whether an expected value is a list.

23. The computer storage medium of claim 22, where the determining includes:
dividing values for facts in the collection of facts having the attribute into two or more components;

for each fact, determining whether each component of a fact belongs to the same category where facts having components belonging to the same category are list facts;

scoring a group of list facts; and comparing the score for the group of list facts relative to a global score for list facts across attributes.

24. The computer storage medium of claim 17, further comprising instructions that when executed by data processing apparatus cause the data processing apparatus to perform operations comprising identifying expected values for attributes associated with particular entity categories.

* * * * *

UNITED STATES PATENT AND TRADEMARK OFFICE
CERTIFICATE OF CORRECTION

PATENT NO. : 8,560,468 B1
APPLICATION NO. : 13/025117
DATED : October 15, 2013
INVENTOR(S) : Kevin Lerman et al.

Page 1 of 1

It is certified that error appears in the above-identified patent and that said Letters Patent is hereby corrected as shown below:

In the Claims

In Claim 7, column 13, line 12, delete "; core" and insert -- score --.

Signed and Sealed this
Thirty-first Day of December, 2013

Margaret A. Focarino
*Commissioner for Patents of the United States Patent and Trademark Office*